F. FUCHS.
STEAM ENGINE.
APPLICATION FILED MAY 26, 1910.
1,046,170.
Patented Dec. 3, 1912.
2 SHEETS—SHEET 2.
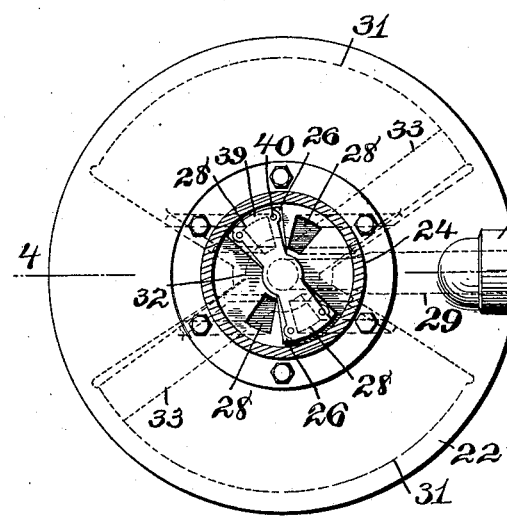
Fig. 3
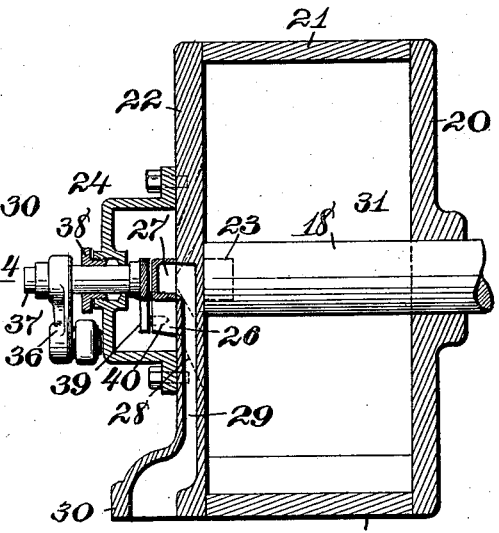
Fig. 4
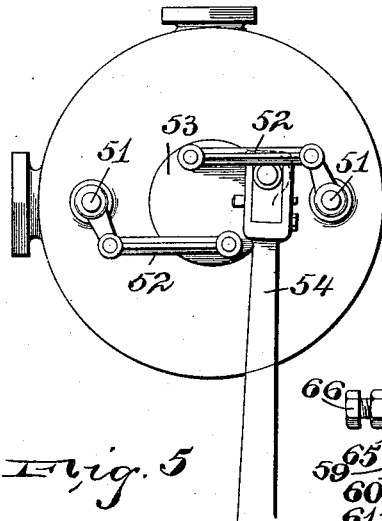
Fig. 5
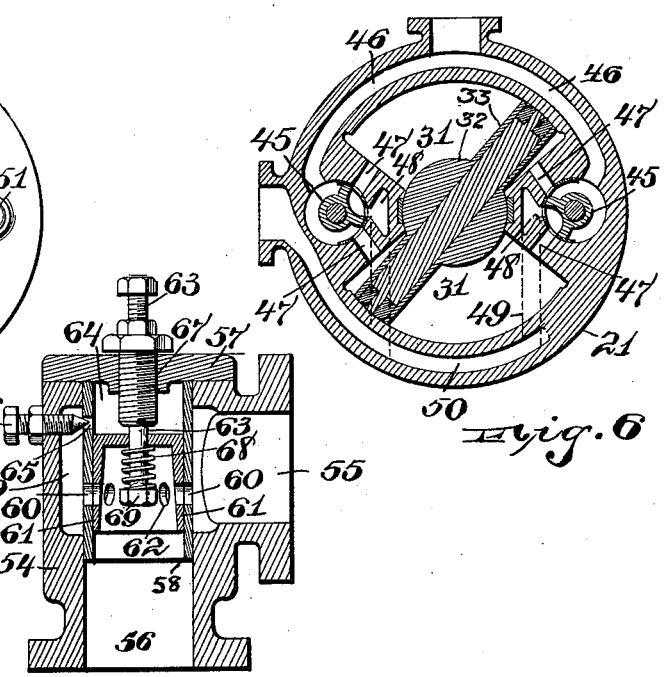
Fig. 6
Fig. 7
WITNESSES:
E. A. Pell
M. A. Johnson
INVENTOR
Fredrick Fuchs
BY
Wm. H. Canfield
ATTORNEYS
COLUMBIA PLANOGRAPH CO., WASHINGTON, D. C.

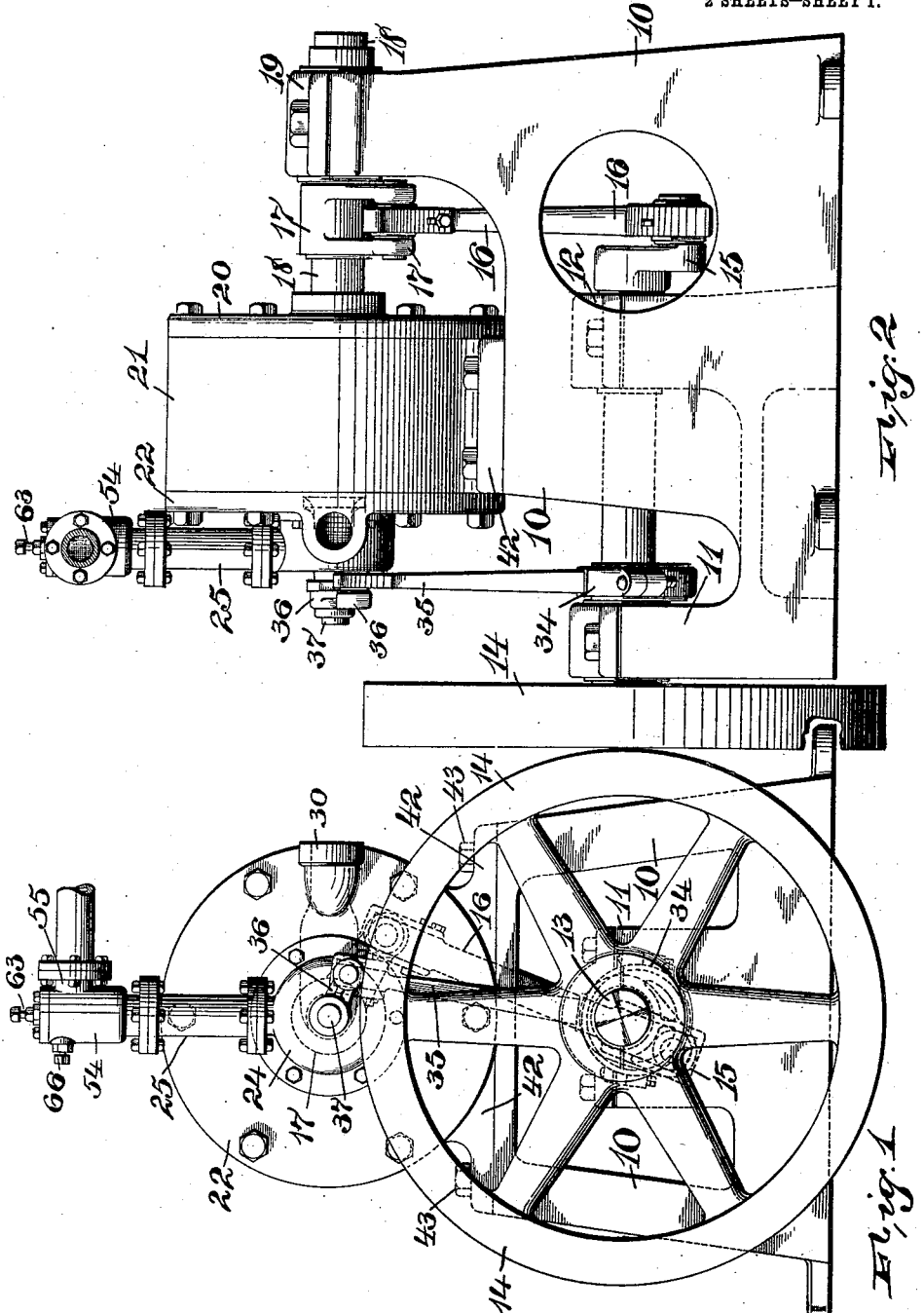

UNITED STATES PATENT OFFICE.

FREDRICK FUCHS, OF ELIZABETH, NEW JERSEY.

STEAM-ENGINE.

1,046,170.  Specification of Letters Patent.  Patented Dec. 3, 1912.

Application filed May 26, 1910. Serial No. 563,478.

*To all whom it may concern:*

Be it known that I, FREDRICK FUCHS, a citizen of the United States, residing at Elizabeth, in the county of Union and State of New Jersey, have invented certain new and useful Improvements in Steam-Engines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an engine which is adapted to be used by a fluid under pressure, and is particularly adapted for a steam engine, being compact and provided with bearings disposed to give stability and strength to the engine, and also provide an arrangement of parts that permits the engine to be put in a small space considering the power it will develop.

The engine is of a type employing a cylinder in which a pivoted piston is adapted to oscillate, swinging back and forth so as to rock its rod and a crank, and having a link connecting the rocking crank with the crank shaft of the engine, the crank shaft having its crank shorter than the rocking crank to convert the oscillating of the piston rod into the rotary movement of the crank shaft.

The device also comprises a set of valves operated from the crank shaft to regulate the admission of steam to the cylinder.

A further object of the invention is to provide an engine having a governor thereon which is actuated from the engine to govern its speed by in turn regulating the amount of fluid under pressure that is admitted to the engine.

The invention is illustrated in the accompanying drawings, in which—

Figure 1 is an end view of the engine, and Fig. 2 is a side view thereof. Fig. 3 is a face view of the cylinder with the steam chest broken away to show the valves, and Fig. 4 is a section on line 4, 4, in Fig. 3, but with the piston removed. Fig. 5 is a face view of the cylinder with a modified form of valve operating device, and Fig. 6 is a section showing the valves operated by the device shown in Fig. 5, these valves being a modification of the construction shown in the previous figures. Fig. 7 is a section of the governor.

The engine comprises a frame 10 which forms a bed for the engine and has bearings 11 and 12 thereon which support the crank shaft 13 which is provided with the usual form of fly-wheel 14. The crank shaft is provided on its inner end, that is, the end opposite the fly-wheel, with a crank 15 which is connected, by means of a connecting rod 16, with the rocking crank 17 which is secured on the piston rod 18 and is adapted to be rocked by a mechanism inclosed in the cylinder, the outer end of the piston rod being mounted in a bearing 19 on the frame or bed 10. The piston rod passes through one end plate 20 of the cylinder 21 and abuts and is adapted to swing on the end plate 22 of the cylinder, and is preferably formed, as in Fig. 4, so that it fits over and rotates on the stud 23. On the face of the cylinder, and preferably attached to the end plate 22, is a steam chest 24 which is supplied, by means of the inlet pipe 25, with steam, and a pivoted rocking valve 26 is mounted against the face of the end plate 22, this valve being hollow on its under side to provide a passage 27, which passage is adapted to be swung in register with the ports 28, which ports are four in number and are arranged in pairs diametrically opposite so that they alternately open to receive steam from the steam chest 24, and are then closed by the valve 28 so as to be in communication with the passage 27 in the valve, which passage 27 is central to and always in communication with the outlet or exhaust port 29 which is preferably formed through the end plate 22 and terminates in a pipe or other connection 30. The ports 28 extend through the end plate 22, as shown in Figs. 3 and 4, and lead into the opposite ends of the two chambers 31 which are arranged on opposite sides of the cylinder and are separated from each other by the hub 32 of the piston 33, which piston 33 is adapted to oscillate in the cylinder, the opposite sides of the opposite ends of the piston being forced by steam admitted through the ports 28 that are opened to the steam chest, and when the piston is so driven it rocks its piston rod 18 and the rocking crank 17 and operates the connecting rod 16 to rotate the crank 15 and thus cause the revolution of the crank shaft 13, the crank shaft 13 in turn actuating the valve by means of an eccentric 34, or its mechanical equivalent, which is connected, by a rod 35, with a lever 36 which is fastened to an axle 37, which axle projects through the stuffing-box 38, shown in Fig. 4, and is secured to a plate 39 which is arranged adjacent to the face of the valve 26 and is provided with pins 40 which are arranged to loosely project into recesses in the valve so that the valve is positively turned by the plate 39, but has an allowance for wear, being constantly held against the face of the cylinder of the head or end plate by the pressure of the steam. This connection forms a rigid one as far as the rotatable motion is concerned, but forms a somewhat flexible connection in the direction of the end plate of the cylinder. The cylinder is preferably provided with the lugs 42 which rest on the bed plate 10 and is fastened in place by the bolts 43.

A modified form of engine is shown in Figs. 5 and 6 where separate valves 45 are shown mounted to oscillate in the cylinder to alternately admit steam from the inlet passage 46 to the inlet ports 47, and alternately connect these ports with the outlets 48, which outlets are connected, preferably through one of the end plates by means of the ducts 49, with the outlet passage 50. The valves 45 are regulated by means of the shafts 51 to which they are attached, these shafts being operated in unison by being connected with the rods 52 and a wrist plate 53 which is adapted to be operated by the arm 54 which can be in turn actuated, by a suitable mechanism, from the crank shaft 13.

To govern the engine I prefer to place thereon a governor shown in Figs. 1 and 2 in elevation, and in section in Fig. 7. The governor comprises a casing 54 with an inlet 55 and an outlet 56, which outlet is placed on the inlet pipe 25 of the engine. The casing 54 is provided with a top 57 and has arranged therein a sleeve 58 which is surrounded by a chamber or channel 59 connected with the inlet 55, the sleeve having a series of perforations 60 arranged therein, and having a sliding thimble 61 which is perforated as at 62 and is adapted to slide on a rod 63 so that the perforations 62 and 60 can be thrown in and out of register by the sliding of the thimble to thus regulate the amount of steam admitted to the outlet 56 from the inlet 55. The thimble and the top 57 form, between them, a chamber 64 and communication between this chamber and the chamber 59 is established through an opening 65 in the wall of the sleeve above the thimble, and a regulating screw or similar device 66 is placed in the walls of the device and is adapted to be operated from the exterior to regulate the amount of steam that can pass through the passage 65. The upward movement of the thimble is regulated by a stop screw 67 through which passes the regulating screw 63 on which the thimble slides, the thimble being held in its normal position by a spring 68 abutting on one end on the inside of the top of the thimble, and on the other end on the head 69 of the rod 63. When the engine "races" or is running too fast the steam pressure in the inlet pipe 25, and also in the outlet 56 of the governor, will be decreased and cause a suction on the thimble which is moved downward, this being also emphasized by the steam pressure in the chamber 64 which would tend to force the thimble downward, since the pressure passing through the perforations 65 on top of the thimble would cover more area and would also be greater than the pressure in the engine if the engine is running beyond its speed. The thimble is thus pressed down against the action of the spring 68, and the perforations in the thimble passing out of register with the perforations in the sleeve will cause the opening through these perforations to become smaller, and thus the supply of steam is cut down and the engine will slacken its speed through this shutting off of the power.

The device can be regulated as the conditions require, and the governor being automatic and requiring no belts or rotating parts, is thought to be one whose action is assured by reason of its simplicity.

Having thus described my invention, what I claim is:—

An engine comprising a bed plate having alined bearings for the reception of a crank shaft, a crank shaft in the bearings, an upper bearing, a cylinder above the crank shaft bearings, an oscillating piston in the cylinder, a piston rod secured to the piston and projecting from one end of the cylinder and having its projecting end journaled in the upper bearing, a rocking crank on the piston rod between the bearing of the piston rod and the cylinder, a crank on the crank shaft, a connecting rod connecting the crank and the rocking crank, a steam chest on the face of the cylinder opposite the piston rod, an inlet pipe on the steam chest, a cylinder plate supporting the steam chest on its end of the cylinder, the end plate having ports leading from the cylinder to the steam chest, the ports being arranged in diametrically opposite pairs, a valve arranged to swing to alternately cover the diametrically opposite pairs of ports, a rod for actuating the valve, and co-acting means between the crank shaft and the rod for causing the valve to swing.

In testimony, that I claim the foregoing, I have hereunto set my hand this 9th day of April 1910.

FREDRICK FUCHS.

Witnesses:
WM. H. CAMFIELD,
E. A. PELL.

Copies of this patent may be obtained for five cents each, by addressing the "Commissioner of Patents, Washington, D. C."